United States Patent [19]
Christeson et al.

[11] Patent Number: 6,122,733
[45] Date of Patent: Sep. 19, 2000

[54] METHOD AND APPARATUS FOR UPDATING A BASIC INPUT/OUTPUT SYSTEM

[75] Inventors: Orville H. Christeson; Frank L. Wildgrube; Frank E. LeClerg, all of Hillsboro; Jerald Nevin Hall, Scappoose; Mike Kinion, Hillsboro; Sean R. Babcock, Portland, all of Oreg.; John Yuratovac, Rancho Cucamonga, Calif.

[73] Assignee: Intel Corporation, Santa Clara, Calif.

[21] Appl. No.: 08/941,535

[22] Filed: Sep. 30, 1997

Related U.S. Application Data

[63] Continuation-in-part of application No. 08/778,304, Jan. 2, 1997, Pat. No. 5,968,140.

[51] Int. Cl.[7] .................................................. G06F 9/445
[52] U.S. Cl. ............................................. 713/2; 714/15
[58] Field of Search ............................. 710/1, 52, 2, 100; 713/400; 714/1, 2, 15

[56] References Cited

U.S. PATENT DOCUMENTS

| | | | |
|---|---|---|---|
| 5,051,588 | 9/1991 | Agano | 250/327.2 |
| 5,388,267 | 2/1995 | Chen et al. | 710/200 |
| 5,418,778 | 5/1995 | Cummiskey et al. | 370/32.1 |
| 5,579,522 | 11/1996 | Christeson et al. | 713/1 |

*Primary Examiner*—Joseph E. Palys
*Assistant Examiner*—Abu Hossain
*Attorney, Agent, or Firm*—Blakely, Sokoloff, Taylor & Zafman LLP

[57] ABSTRACT

An apparatus includes a storage medium having stored therein a segmented basic input/output system (BIOS) divided among a plurality of segments within the storage medium, and a processor operative to execute the segmented BIOS. In accordance with the teachings of the present invention, the BIOS includes a recovery function that is mode dependent in that while the apparatus is in an update mode the recovery function executes a full reflash of all relevant segments of the segmented BIOS, whereas while the apparatus is in a normal mode the recovery function executes a partial reflash of only identified corrupted BIOS segments.

21 Claims, 7 Drawing Sheets

METHOD AND APPARATUS FOR UPDATING A BASIC INPUT/OUTPUT SYSTEM

RELATED APPLICATIONS

This application is a continuation-in-part of application Ser. No. 08/778,304, filed Jan. 2, 1997, now U.S. Pat. No. 5,968,140, entitled "Method and Apparatus for the Programmable Configuration of Strapping Options on a Circuit Board Assembly" to Jerald N. Hall, and commonly assigned to the assignee of the present application, the disclosure of which is hereby expressly and completely incorporated herein by reference.

BACKGROUND OF THE INVENTION

1. Field of the Invention

The present invention relates to the field of memory management and, in particular, to a method and apparatus for updating a basic input/output system.

2. Background Information

Computer system manufacturers have long relied on configuration selectors, e.g., jumper block assemblies, dip switches, and the like, to configure a number of operational parameters of a computer system. Examples of such operating parameters configured with a plurality of configuration selectors include the bus/core ratio, the processor clock speed and the speaker select (internal/external). Recently, advances in memory management have allowed developers to store more basic input/output system (BIOS) functions in the same memory space occupied by prior art BIOS. That is, the functionality of BIOS has increased without an increased memory allocation. As a result, system developers are beginning to rely on the BIOS to set a number of the operating parameters for the computer system, as disclosed in the contemporaneously filed copending patent application Ser. No. 08/940,636 to Jerald N. Hall, et al. and commonly assigned to the assignee of the present invention. Examples of BIOS configurable operating parameters include the mode of operation (normal/update), password enable/disable, setup enable/disable and a number of extended system configuration parameters maintained in a complementary metal oxide semiconductor (CMOS) memory device.

However, with the expanding the role of BIOS, it necessarily becomes larger and more complex. Those skilled in the art will recognize that as BIOS has become more complex, it is now typically embodied in more advanced forms of nonvolatile memory that are capable of update, such as electrically programmable read only memory (EPROM), electrically erasable programmable nonvolatile memory (EEPROM) and flash memory devices (e.g., flash EEPROM). In many of these prior art systems, the BIOS is updated by erasing the existing contents of the nonvolatile memory, and loading an updated BIOS from an update disk. In flash memory devices, e.g., flash EEPROM, this process is commonly referred to as "reflashing". Those skilled in the art will recognize that with this added complexity of the BIOS and the devices within which they are stored, comes an increased likelihood that the BIOS will become corrupted.

In an effort to detect whether the BIOS has become corrupted, more complex ones of the prior art BIOS will perform a simple checksum analysis on the nonvolatile memory to determine if the memory contents are corrupted. If so, the computer may alert the user to this fact through a series of audible tones (e.g., beeps), or the computer may simply not boot. If a BIOS is determined to be corrupted, many of the prior art systems require that the entire BIOS be reflashed with an updated BIOS, or that the entire nonvolatile memory be replaced. Neither of these prior art approaches to effecting a BIOS update are attractive, as they are inefficient, time consuming and costly.

Thus a need exists for a method and apparatus for updating a basic input/output system, unencumbered with the express and inherent limitations associated with the prior art solutions.

SUMMARY OF THE INVENTION

Briefly, in accordance with the teachings of the present invention, a method and apparatus for updating a basic input/output system (BIOS) is disclosed. In a first embodiment, in accordance with one embodiment of the present invention, an apparatus includes a storage medium having stored therein a segmented basic input/output system (BIOS) divided among a plurality of segments within the storage medium, and a processor operative to execute the segmented BIOS. In accordance with the teachings of the present invention, the BIOS includes a recovery function that is mode dependent in that while the apparatus is in an update mode the recovery function executes a full reflash of all relevant segments of the segmented BIOS, whereas while the apparatus is in a normal mode the recovery function executes a partial reflash of only identified corrupted BIOS segments.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
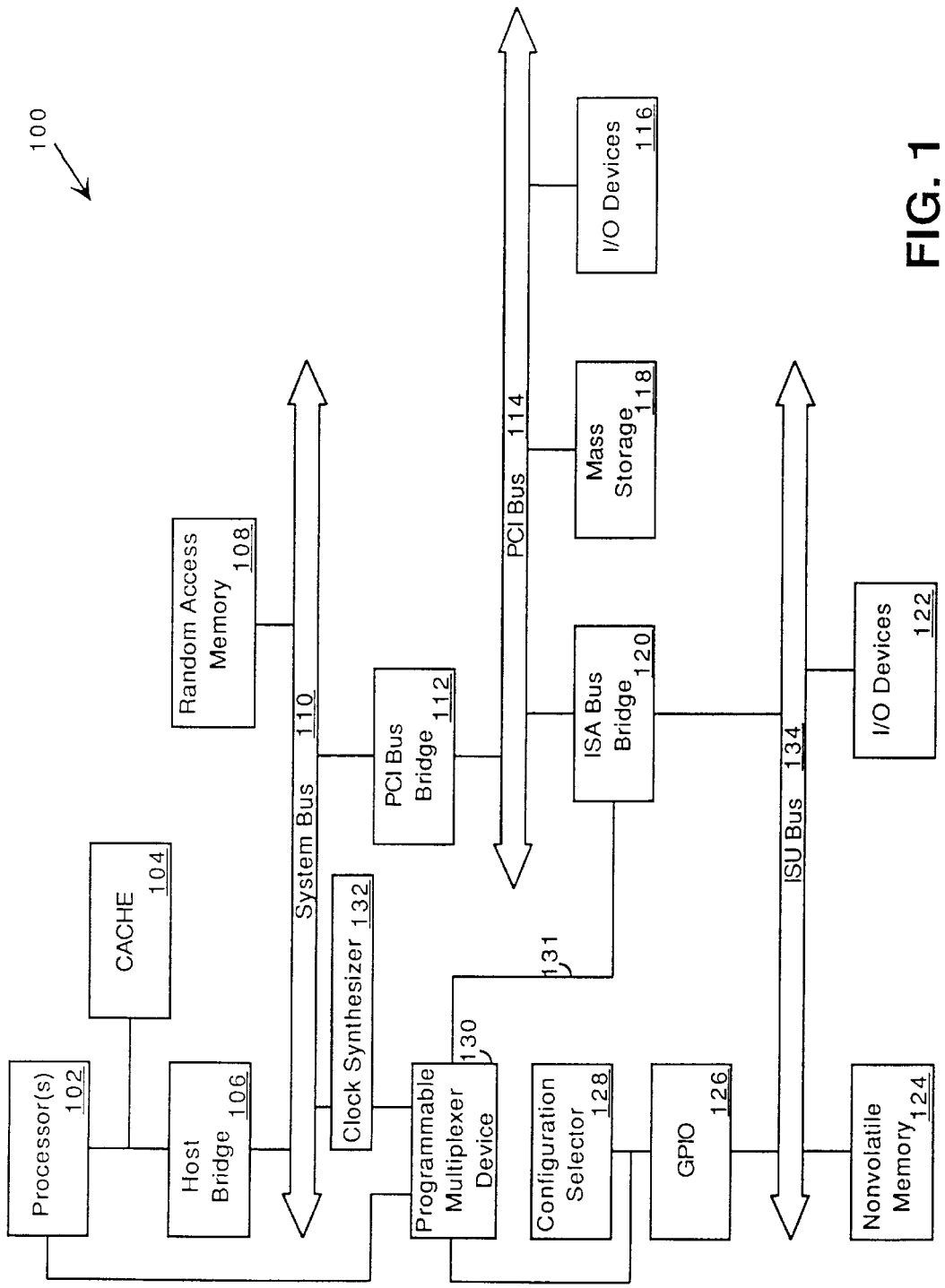
FIG. 1 is a block diagram illustrating one example of a computer system incorporating the teachings of the present invention.

Referring now to FIG. 1, a block diagram illustrating one embodiment of a computer system 100 is depicted incorporating the teachings of the present invention. In the illustrated example of FIG. 1, in accordance with the teachings of the present invention, computer system 100 is shown comprising a single configuration selector 128 which selectively places computer system 100 in one of a plurality of modes. In one embodiment, these modes include a normal mode, a configuration mode, and an update mode. As will be described more fully below, as computer system 100 boots in the normal mode, the BIOS analyzes each of the plurality of segments comprising the segmented BIOS and corrupted ones of the plurality of BIOS segments are identified, whereupon only those segments identified as corrupted are reflashed. Thus, in accordance with one example of the teachings of the present invention, the innovative BIOS of the present invention identifies corrupted BIOS segments and, if necessary, reflashes only those segments that have been identified as corrupted. In addition, in accordance with another example of the teachings of the present invention, while operating in update mode, a full reflash of all relevant segments of the segmented BIOS (described below) is executed. These and other advantages of the present invention will be described more fully below.

Continuing with the description of FIG. 1, in one example embodiment, the operating parameters for computer system 100 are set by way of single configuration selector 128 in combination with an innovative segmented basic input/output system (BIOS) stored within nonvolatile memory 124. The operating parameters include the operating parameters of clock synthesizer 132, the operating parameters of processor(s) 102, and the operating parameters of other configurable devices, not depicted. Thus, in accordance with the illustrated example embodiment of FIG. 1 the operating parameters for computer system 100 may be set with the selective configuration of a single configuration selector 128 communicatively coupled to nonvolatile memory 124 having stored therein an innovative segmented BIOS, through ISA bus 134 the detail of which will be described in further detail with reference to FIGS. 2–7.

As illustrated in the example embodiment of FIG. 1, processor(s) 102 and cache 104 are coupled to system bus 110 through host bridge 106. In addition, random access memory 108 and clock synthesizer are coupled to system bus 110, as depicted. In one embodiment, bridge 112 is coupled to system bus 110 for coupling system bus 110 to one or more, typically input/output (I/O) buses. In one embodiment, the I/O bus is a Peripheral Component Interconnect (PCI) bus 114, and bridge 112 is a system to PCI bus bridge. In the illustrated example, system to PCI bus bridge 112 couples system bus 110 to PCI bus 114. In one embodiment, mass storage device 118 such as a magnetic or optical disk is coupled to PCI bus 114 for storing information and instructions for processor 102. In one embodiment, I/O devices 116 are coupled to PCI bus 114 which input and output data and control information to and from processor 102. Common examples of such I/O devices 116 may include a display device, an alphanumeric input device including alphanumeric and function keys, and a cursor control device. In one embodiment, a hard copy device such as a plotter or printer may also be included in the devices cumulatively referred to as I/O devices 116 for providing a visual representation of computer images. In one embodiment, a network adapter device may be included in the I/O devices 114 for coupling computer system 100 to a computer network, such as a Local Area Network (LAN).

In the illustrated embodiment of FIG. 1, PCI bus 114 is coupled to another, typically I/O, bus via bus bridge 120. In one embodiment, PCI bus 114 is coupled to Industry Standard Architecture (ISA) bus 134 via PCI to ISA bus bridge 120. In one embodiment, a nonvolatile memory is coupled to ISA bus 134 for storing information and instructions for processor 102, e.g., nonvolatile memory 124. In the illustrated example embodiment, nonvolatile memory 124 is a flash memory device (e.g., flash electronically erasable programmable read only memory (flash EEPROM)). Of course, those skilled in the art will appreciate that other nonvolatile memory devices such as an electrically programmable read only memory (EPROM) may also be used.

Some flash memory devices only permit complete erasure and reprogramming of all memory locations within the device. Other flash memory devices are partitioned into basic blocks of memory which represent the smallest individually reflashable segment of memory. Those skilled in the art will appreciate that the size of which may vary depending upon the manufacturer of the flash memory device. Accordingly, as the term is used throughout this disclosure, reflashing refers to the erasure and reprogramming of segments of memory comprised of at least one basic memory block, and may contain multiple increments of the basic memory block.

In accordance with the teachings of the present invention, nonvolatile memory 124 stores a plurality of instructions for implementing a segmented basic input/output system (BIOS) having a plurality of functions which controls the input/output services and the start-up (a.k.a., boot) process of computer system 100. One example configuration of nonvolatile memory 124 is presented in the illustrated example embodiment of FIG. 7, and will be described in further detail below.

Continuing with FIG. 1, in one embodiment of computer system 100 I/O devices 122 are coupled to ISA bus 134, which input and output data and control information to and from processor(s) 102. I/O devices 122 may, for example, include some of the same devices as illustrated in I/O devices 116 discussed above. In one embodiment, PCI to ISA bus bridge 120 is configured to communicate with programmable multiplexer device 130 (also referred to as a programmable configuration selector). In one embodiment, programmable multiplexer device 130 is a "4-bit 1-Of-2 I²C Multiplexer" device communicatively coupled to PCI to ISA bus bridge 120 as depicted. A more detailed description of the operation of programmable multiplexer 130 is provided in the parent application, and a more detailed description of its operation within the present invention will be provided below, with reference to the illustrated example embodiment of FIG. 2.

As will be appreciated by those skilled in the art, except for the innovative configuration of computer system 100 operating parameters with a single configuration selector 128 in concert with the complementary BIOS stored within nonvolatile memory 124, elements 102 through 134 perform their conventional function as known in the art. In addition, except for I/O devices 116 and 122, and mass storage device 118, elements 102–134 of computer system 100 are disposed on circuit board assembly (although the invention is not so limited in scope in this respect).

Figure 2:
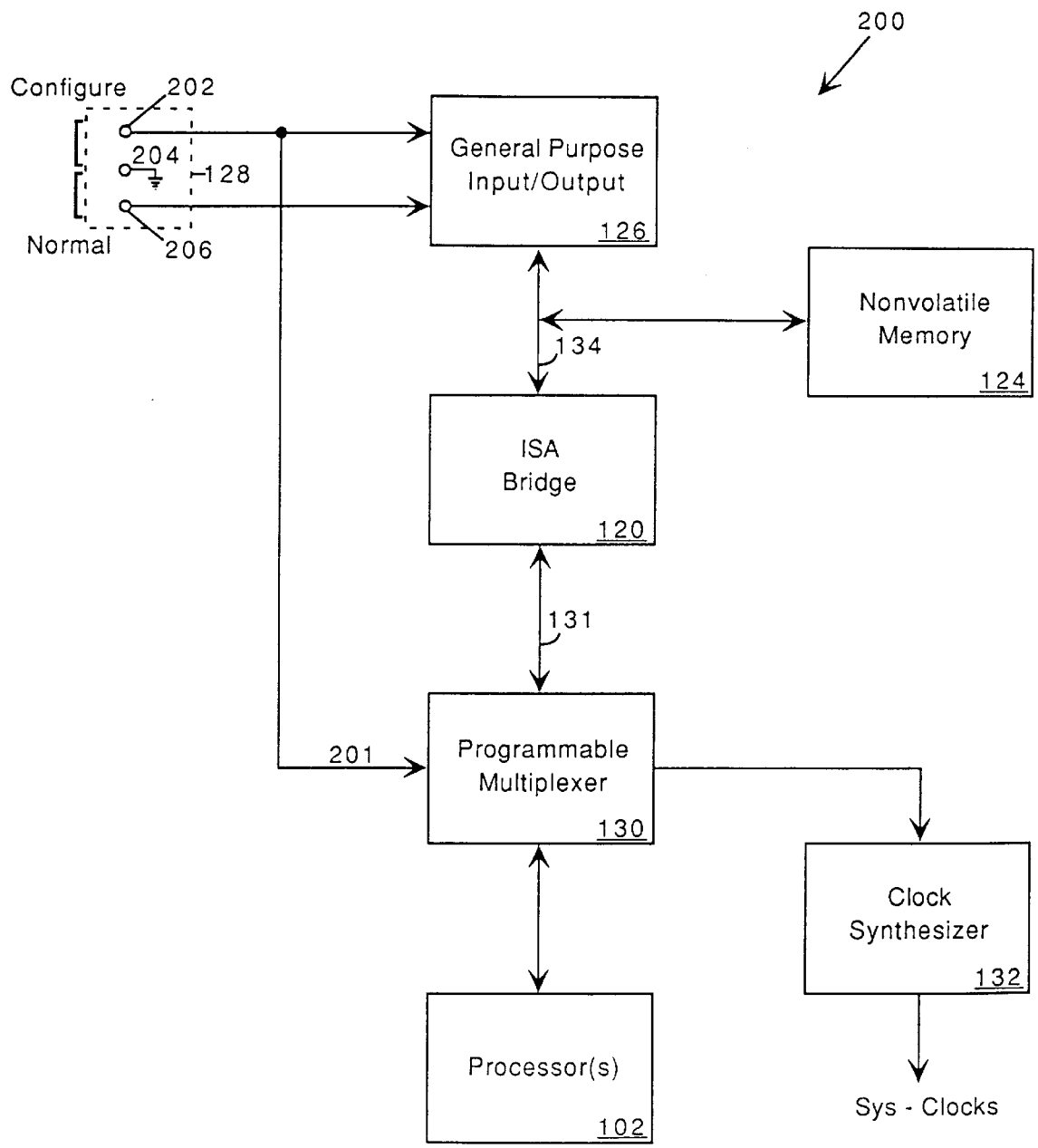
FIG. 2 is a block diagram illustrating the hardware components of the present invention accordance with one embodiment of the present invention.

Turning next to FIG. 2, a block diagram illustrating the interrelation of elements incorporating the teachings of the present invention to effect the selective configuration of example computer system 100 is depicted. In the illustrated example embodiment, single configuration selector 128 is depicted coupled to a general purpose input/output device 126 having a plurality of general purpose inputs and a plurality of general purpose outputs. One example of a suitable general purpose input/output device is a Super I/O™ device, commonly available from National Semiconductor, of Santa Clara, Calif. Those skilled in the art will appreciate, however, that other suitable devices exist. As illustrated in the example embodiment of FIG. 2, configuration selector 128 is communicatively coupled to nonvolatile memory 124 via general purpose input/output device 126 via ISA bus 134. In the illustrated embodiment, configuration selector 128 is directly coupled to programmable multiplexer 130, although those skilled in the art will appreciate that configuration selector 128 may well be indirectly coupled to programmable multiplexer 130 in alternate embodiments. In addition, configuration selector 128 is communicatively coupled to a plurality of configurable devices (e.g., clock synthesizer 132 and processor(s) 102 via general purpose input/output device 126, PCI to ISA bus bridge 120 and programmable multiplexer device 130, as depicted.

As will be discussed in greater detail below, with reference to FIGS. 3–6, programmable multiplexer 130 operates to configure the clock speed of clock synthesizer 132, as well as providing bus/core ratio information to processor(s) 102. In accordance with the teachings of the present invention, when computer system 100 is operating in configuration mode, programmable multiplexer 130 operates to configure the clock synthesizer 132 and processor(s) 102 with minimal default clock speed and bus/core ratio information that is common to a family of processors and/or buses that may be employed within computer system 100, thereby ensuring a nominal level of functionality without apriori knowledge of the particular processor/bus employed in computer system 100. While operating in normal configuration mode, programmable multiplexer 130 will output programmed clock speed and bus/core ratio information, in accordance with the clock speed and bus/core ratio information programmed into the programmable multiplexer 130. A detailed description of the programming and operation of programmable multiplexer 130 is found in the incorporated by reference parent application. A more detailed description of the operation of programmable configuration selector 130 within the context of the present invention is presented below with reference to Table 1 and FIGS. 3–6, below.

With continued reference to the illustrated example embodiment of FIG. 2, configuration selector 128 is a jumper block assembly having a header with three posts 202, 204 and 206, and a jumper capable of coupling any adjacent two of the three posts (e.g., posts 1 and 2, or posts 2 and 3). As depicted, center post 204 (post 2) is tied to the ground of computer system 100. Therefore, using the jumper to couple any two of the three posts will tie either first post 202 or third post 206 to second post 204 (e.g., ground). Consequently, in accordance with the illustrated example embodiment, the selective configuration of configuration selector 128 denotes one of three available operating modes for computer system 100. In one embodiment, for example, the selective configuration of configuration selector 128 alternatively places computer system 100 into normal mode, update mode, or configuration mode, incorporated with the teachings of the present invention. A summary of the correlation between the state of configuration selector 128, the mode of operation, and the output signal of programmable multiplexer 130 is depicted in Table 1, below.

TABLE 1

System Operational Mode Denoted By Single Configuration Selector

| Configuration Selector Settings | | Operational Mode | Programmable Multiplexer Output |
|---|---|---|---|
| 0 | 0 | Reserved | Default Settings |
| 0 | 1 | Configuration mode | Default Settings |
| 1 | 0 | Normal Mode | Programmed Settings |
| 1 | 1 | Update Mode | Programmed Settings |

As illustrated in Table 1, in accordance with one example embodiment of the present invention, when the jumper of configuration selector 128 couples first post 202 to second post 204, the segmented BIOS will operate in Configuration mode, and programmable multiplexer 130 outputs a default clock speed and bus/core ratio information common to a family of processors and buses that may be employed within computer system 100. As will be described in greater detail below, in one embodiment, the default clock speed and bus/core ratio information configures clock synthesizer 132 to provide the slowest clock speed and lowest bus/core ratio supported by processor(s) 102. When the jumper of configuration selector 128 couples third post 206 to second post 204, the BIOS will operate in Normal Mode, and programmable multiplexer 130 will output programmed clock speed and bus/core ratio information that is particularly suited to the actual processor and bus employed by computer system 100. Otherwise, if the jumper does not couple any two of the three posts 202–206 of configuration selector 128, the segmented BIOS will operate in Update Mode, and programmable multiplexer 130 will output programmed clock speed and bus/core ratio information.

Figure 3:
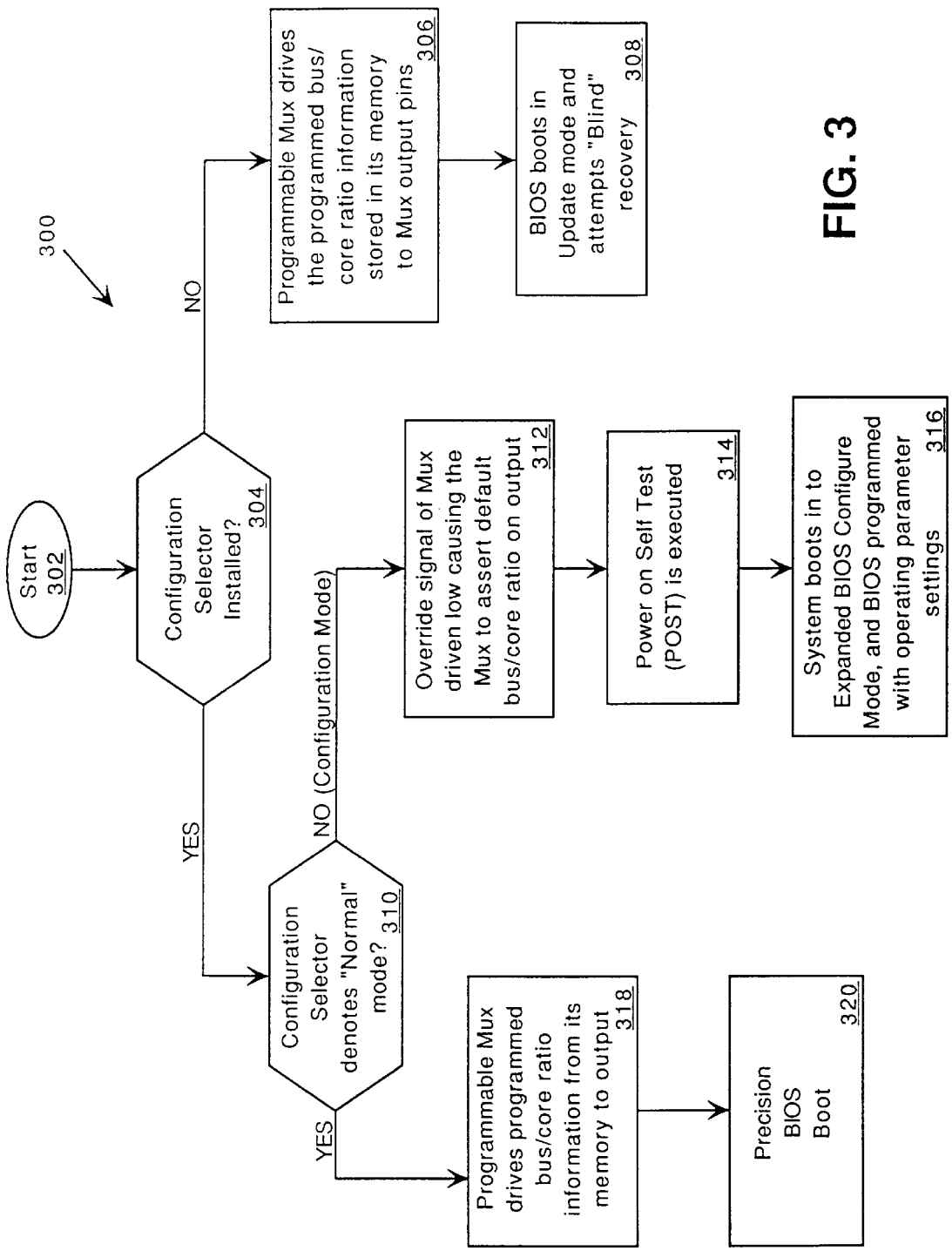
FIG. 3 is a flow chart illustrating one example of the method steps for implementing a segmented basic input/output system (BIOS), in accordance with one embodiment of the present invention.
Figure 4:
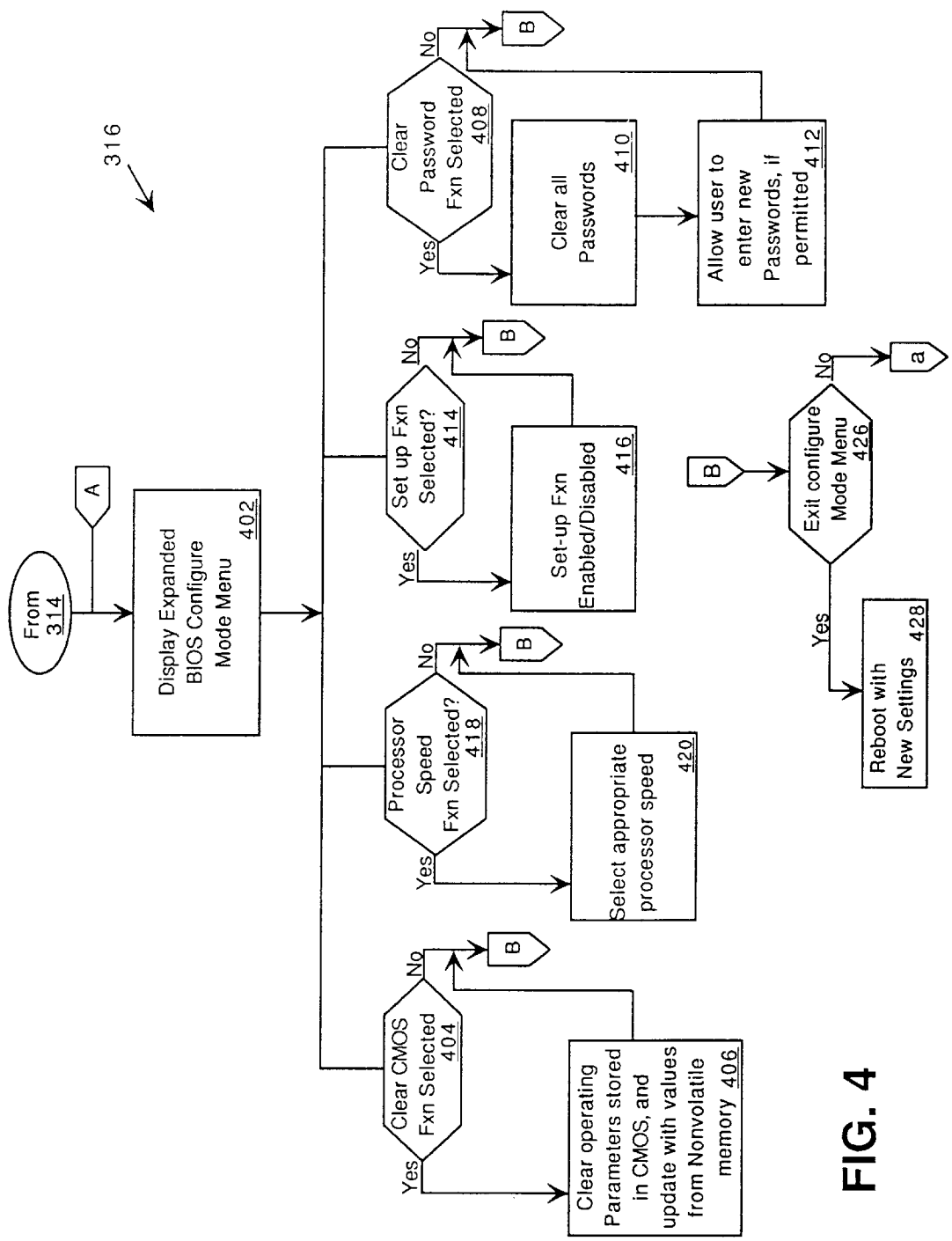
FIG. 4 is a flow chart illustrating one example of the method steps for a BIOS operating in configuration mode, in accordance with the teachings of the present invention.
Figure 5:
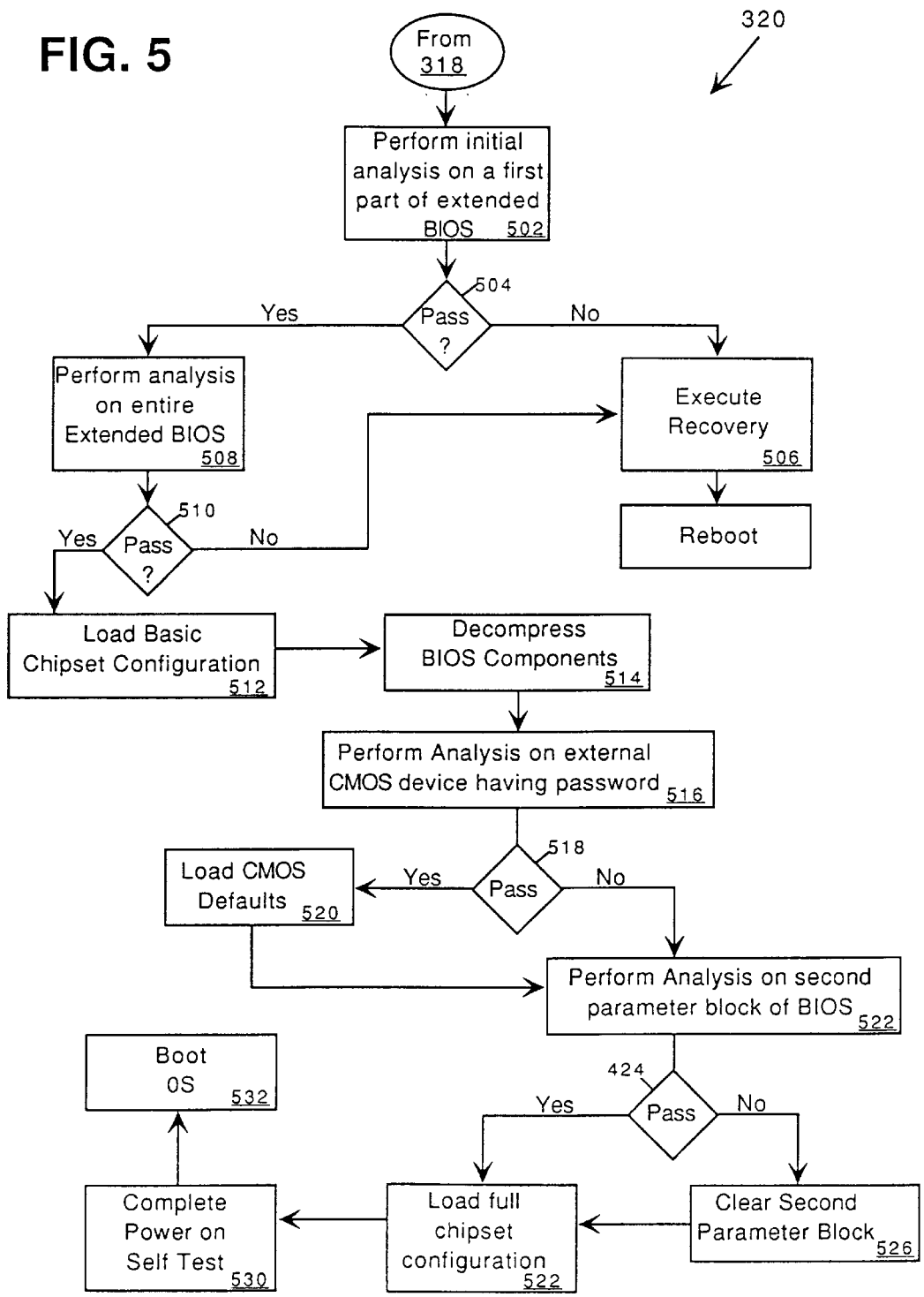
FIG. 5 is a flow chart illustrating one example of the method steps for a BIOS operating in normal mode, in accordance with the teachings of the present invention.
Figure 6:
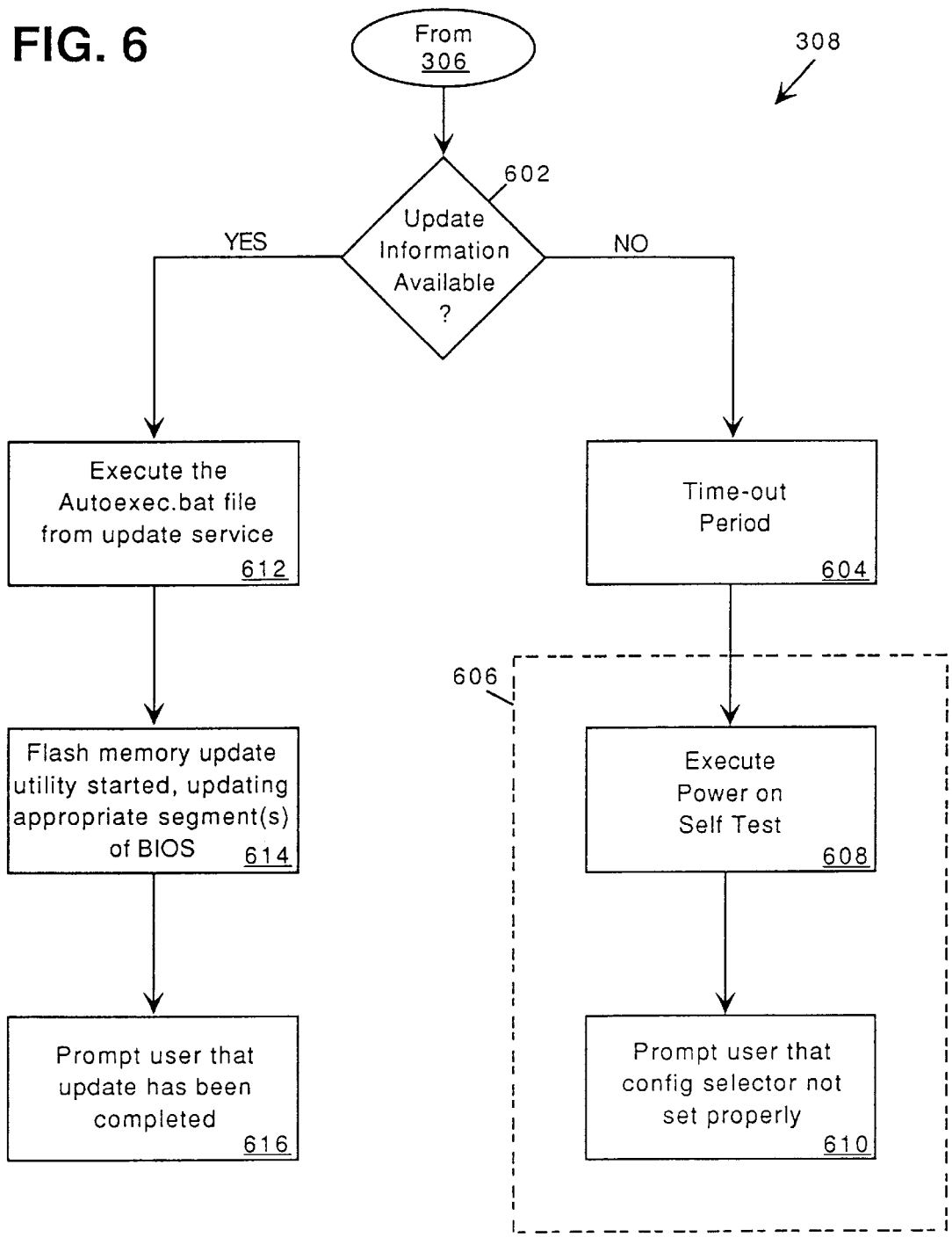
FIG. 6 is a flow chart illustrating one example of the method steps for a BIOS operating in an update mode, in accordance with the teachings of the present invention.

Having generally described the hardware elements of the present invention in FIGS. 1 and 2, above, the operation of the present invention will be further described with reference to FIGS. 3 through 7. FIG. 3 provides a flow chart illustrating one example of the method steps for implementing a complementary BIOS for setting the operating parameters of the computer system, thereby reducing the number of configuration selectors required to configure computer system 100, in accordance with one embodiment of the present invention. FIGS. 4 through 6 illustrate one example of the method steps for implementing the different operating modes of the BIOS illustrated in FIG. 3, while FIG. 7 provides a graphical representation of the memory elements of one example of nonvolatile memory 124 having stored therein the BIOS described in FIGS. 3 through 6.

Figure 7:
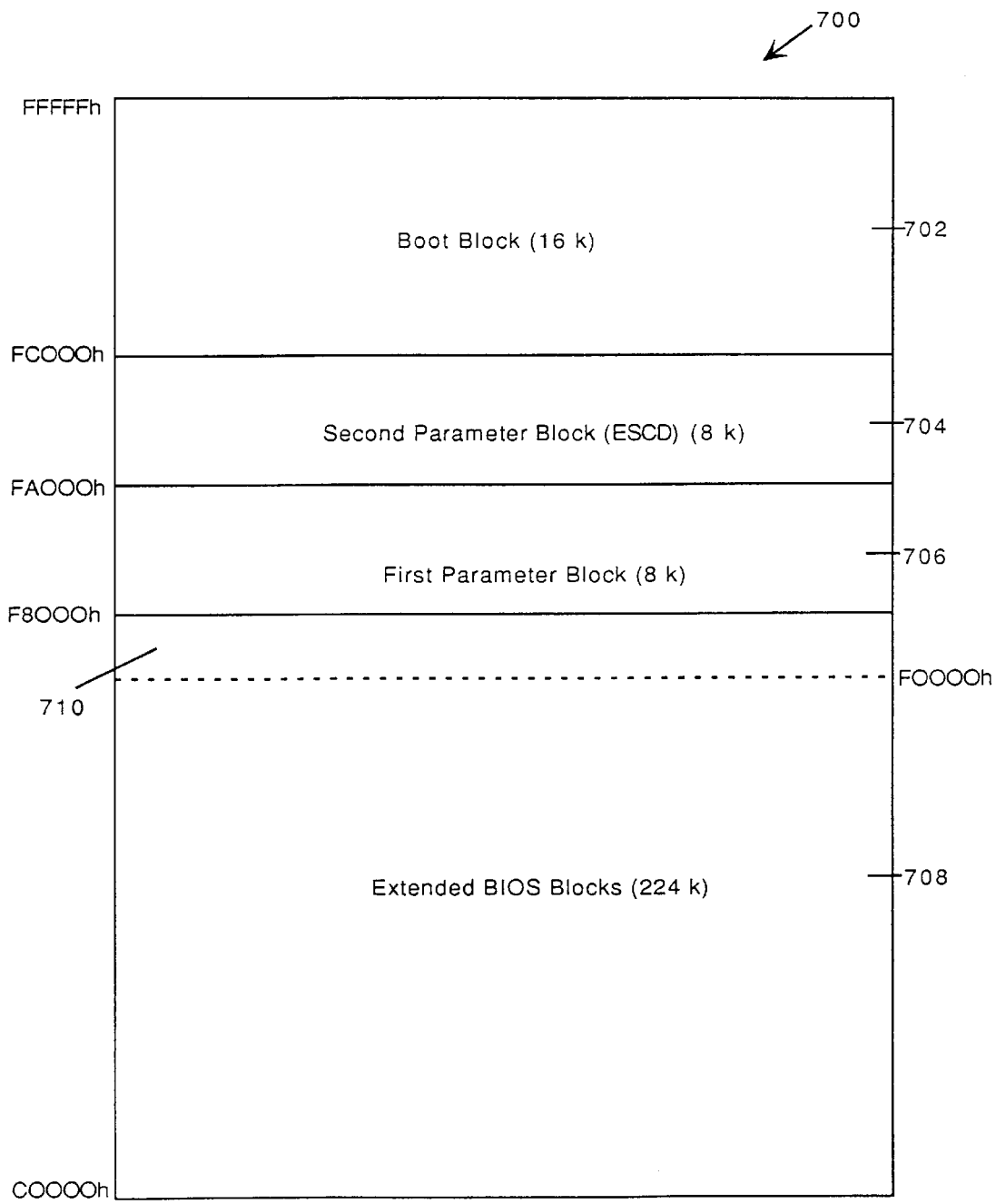
FIG. 7 is a graphical representation of one example of a memory device having stored therein the segmented BIOS of FIG. 3, in accordance with the teachings of the present invention.

Before delving into the detailed description of the method steps of FIGS. 3 through 6, however, reference is made to FIG. 7 wherein a graphical illustration of one example of a memory map for nonvolatile memory 700 is presented. In one embodiment, nonvolatile memory 700 is beneficially incorporated into computer system 100 as nonvolatile memory 124. In one embodiment, nonvolatile memory 700 has stored therein a segmented BIOS. As depicted in the illustrated example of FIG. 7, the segmented BIOS is shown comprising boot block 702, second parameter block 704, first parameter block 706 and an extended BIOS block 708. In the illustrated embodiment, the segmented BIOS is stored within 256K of nonvolatile memory 700 from storage element C0000hex to FFFFFhex. Those skilled in the art will appreciate, however, that BIOS's come in a number of sizes, and may well be stored anywhere within the nonvolatile memory.

As illustrated within the example embodiment of FIG. 7, boot block 702 represents a static portion of the BIOS comprising fundamental elements of the BIOS that will not change over time. As computer system 100 is turned on or reset, the "boot" process begins by accessing boot block 702, which initiates and executes the rest of BIOS (in the remaining segments) (as will be discussed below) and subsequently boots an operating system (OS). In one embodiment, boot block 702 is a 16 Kb block of nonvolatile memory 700 stored in elements FC000hex to FFFFFhex. In the illustrated embodiment of FIG. 7, boot block 702 is not writeable. That is, in accordance with one embodiment of the present invention, during an update procedure (described more fully below) wherein the flash memory denoted by nonvolatile memory 124 is "reflashed" (e.g., electrically erased and reprogrammed), boot block 702 remains unchanged. In alternate embodiments, however, the entire BIOS may be "reflashed".

Continuing with the illustrated embodiment of nonvolatile memory 700, second parameter block 704 is an 8 Kb block of nonvolatile memory 700 stored in elements FA000hex to FBFFFhex. In one embodiment, second parameter block 704 has stored therein the BIOS parameters relating to the Extended System Configuration Data (ESCD). In one embodiment, the ESCD includes configuration information regarding computer system 100 peripheral cards and components. In one embodiment, the ESCD includes information regarding peripheral cards and components conforming to the Plug-N-Play™ interface protocol. In one embodiment, first parameter block 706 is an 8 Kb block of nonvolatile memory 700 stored in elements F8000hex to F9FFFhex.

In the illustrated embodiment of FIG. 7, extended BIOS block 708 is a 224 Kb block of memory which extends from memory element C0000hex to F7FFFhex of nonvolatile memory 700. In one embodiment, the majority of the BIOS is stored within extended BIOS region 708. Also depicted in FIG. 7 is segment 710 a 32 Kb block of memory which extends from memory element F0000hex to F7FFFhex of extended BIOS block 708. In one embodiment, a memory map for nonvolatile memory 700 is partially stored within segment 710.

Turning next to FIG. 3, a flow chart illustrating one example of the method steps of a BIOS begins in step 302 where computer system 100 boots upon initial power-up, or upon system reset. In either case, computer system 100 performs the same boot process in powering up computer system 100 to a point where a user may utilize the system. During the boot process of computer system 100 incorporated with the teachings of the present invention, nonvolatile memory 124 receives the output signal of configuration selector 128 denoting the operating mode via general purpose I/O 126. In step 304, a determination is made as to the state of configuration selector 128, e.g., whether a jumper has been installed, and if so over which posts 202–206.

If in step 304 it is determined that a jumper has been installed, a further determination is made in step 310 to determine whether the jumper has been installed to configure configuration selector 128 to denote the normal mode or the configuration mode. If in step 310 it is determined that configuration selector 128 is denoting configuration mode (e.g., for Table 1, above, "01"), programmable multiplexer 130 drives a default set of clock synthesizer and bus/core ratio information to clock synthesizer 132 and processor(s) 102, as described above with respect to FIG. 2. In one embodiment, when in configuration mode override# input 201 of programmable multiplexer 130 is driven which drives the output pins of programmable multiplexer 130 to ground (e.g., all "0's"), thereby configuring clock synthesizer 132 and processor 102 to operate at the lowest clock speed and bus/core ratio for the processor/bus family, step 312.

In step 314, power on self-test (POST) is executed. In one embodiment of the present invention, while in configuration mode, complementary BIOS relies on the default CMOS settings, and not the user CMOS settings (to be described more fully below) to check out and configure computer system 100 during POST. In one embodiment, POST may include an exhaustive memory test, a configuration of bootable devices (e.g., display), configuration of the keyboard, catalog installed peripherals and programming of the chip set and particular reserved memory regions.

Having completed POST, step 314, computer system 100 boots into an expanded BIOS set-up mode, wherein the user configures the BIOS with a plurality of computer system operating parameters via a graphical user interface (GUI), step 316, which are asserted to configure the operating parameters of computer system 100 when the BIOS is booted in normal mode (to be discussed in greater detail, below). The beneficial programming of the BIOS with operating parameters asserted when computer system 100 is operating in normal mode, without requiring additional configuration selectors, reduces the need for a plurality of costly configuration selectors to serve the same function. Thus, in accordance with the teachings of the present invention, the number of configuration selectors required may be reduced to a single configuration selector, e.g., configuration selector 128.

Alternatively, if in step 310 configuration selector 128 has been configured to denote normal mode (for Table 1, above, "10"), programmable multiplexer 130 asserts a signal on its output pins representing programmed clock speed and bus/core ratio values retained in its memory, thereby configuring clock synthesizer 132 and processor 102 to operate at a speed particularly suited to the particular processor/bus combination employed by computer system 100, step 318. As indicated above, the method and apparatus wherein programmable multiplexer 130 is programmed with clock speed and bus/core ratio values is described in the parent application. In step 320, the BIOS continues with precision boot process of the normal mode, described in greater detail below with reference to FIG. 5.

Returning to step 304, if a jumper is not installed on configuration selector 128 (for Table 1, above, "11") computer system 100 is configured to operate in update mode. In update mode, programmable multiplexer 130 asserts a signal on its output pins representing programmed clock speed and bus/core ratio values retained in its memory, thereby configuring clock synthesizer 132 and processor 102 to operate at a speed particularly suited to the particular processor/bus combination employed by computer system 100, step 306. In step 308, the BIOS next attempts to perform a "blind" recovery within update mode. A "blind" recovery is referred to as "blind" because the BIOS does not discriminate between corrupted and uncorrupted segments of relevant portions of the BIOS stored in nonvolatile memory 124, but executes a full reflash of all but the nonrelevant segments of the BIOS, e.g., boot block, vital product data (VPD) block, extended system configuration data (ESCD) block, and the like, stored in nonvolatile memory 124. The update mode will be described in greater detail with reference to FIG. 6.

Thus, with the illustrated example embodiment of FIG. 3, complementary BIOS operation within the three modes of operation has been generally described. Each of the particular functions will next be described in greater detail with reference to FIGS. 4, 5 and 6.

Turning to FIG. 4, BIOS operation within the configuration mode will be developed within the context of FIGS. 1, 2 and 7. As illustrated, FIG. 4 depicts the method steps of one example of a BIOS operation within the configuration mode, in accordance with but one example embodiment of the present invention. Recall, in step 314 of FIG. 3, that power-on self test (POST) has been executed, thus making the keyboard and the display device (not shown) available via the I/O ports. Accordingly, in step 402, a menu for the expanded BIOS set-up mode is displayed, prompting the user of computer system 100 with a number of configurable options for a plurality of operating parameters. In accordance with the illustrated example embodiment of FIG. 4, one such function allows the user to clear the settings of the external CMOS device, step 404. If selected, the settings of the CMOS device are cleared and loaded with default settings from nonvolatile memory 124 via BIOS, step 406. In one embodiment of the present invention, passwords are preserved.

In step 408 of the illustrated example embodiment, the user is provided with the option of clearing system passwords. If selected, all system passwords are cleared in step 410. In one embodiment of the present invention, the user is given an opportunity to enter new system passwords, step 412. In alternate embodiments, the opportunity to enter new passwords is provided within the OS, and not within the configuration mode at step 412. Therefore, in accordance with the illustrated embodiment of FIG. 4, if a user forgets the system password and would otherwise be "locked out" of computer system 100, the user may shut down computer system 100, move configuration selector 128 to the configuration mode, and restart computer system 100 in the configuration mode which provides the user with a menu option to clear the system passwords.

In step 414, the user is provided with a set-up enable/disable function. In one embodiment, the set-up enable/disable function determines whether a user of computer system 100 will be allowed to enter the BIOS set-up mode prior to the OS being loaded, step 416. In one embodiment, when enabled, the set-up enable function allows a user to enter the BIOS set-up mode with the entry of a pre-defined function key, prior to the OS being loaded. In step 418, the user is provided with the option of specifying the processor speed from a plurality of possible speeds corresponding to the family of processors that may form computer system 100. If selected, the user selects the speed of processor from list of a family of processors, step 420.

As illustrated in FIG. 4, the user also has an option to exit the configuration mode, step 426. In one embodiment, if the "end" function is selected, the user is instructed that computer system 100 is about to be shut down, and that the user should reconfigure configuration selector 128 to the "normal" position (e.g., position "10" in accordance with Table 1, above). The user then reboots the BIOS with the new configuration settings, step 420. Although a number of particular operating parameters have been referred to in the development of the example embodiment of FIG. 4, those skilled in the art will appreciate that these are merely illustrative examples and not necessarily an exhaustive list of operating parameters that may be set via the BIOS configuration mode. That is to say, additional parameters may be added, or parameters may be deleted from the configuration menu of the example embodiment of FIG. 4 without deviating from the spirit and scope of the present invention.

Turning next to FIG. 5, the normal mode of operation and, in particular, the precision BIOS boot process generally referenced by step 320 will now be described in the context of FIGS. 1, 2 and 7. As alluded to above, the precision BIOS boot process of the normal mode is referred to as such because the BIOS analyzes and verifies the integrity of a number of separate segments of the BIOS during the boot process, "reflashing" only those segments of memory that have been identified as corrupted. Accordingly, the BIOS is able to identify those segments of memory, if any, where corruption of the BIOS segments exists and reflashes only those segments.

In accordance with the illustrated example embodiment of FIG. 5, the precision boot process of the normal mode begins in step 502 where an initial analysis or verification of a first segment of the BIOS is performed. In one embodiment, the BIOS executes a BIOS verification function. In one embodiment, the verification function is comprised of a checksum verification of the integrity of the memory segment. In one embodiment, the initial analysis of a first segment of the BIOS is performed within the extended BIOS region from memory elements F0000hex to F7FFFhex, denoted in FIG. 7 as segment 710. In accordance with the illustrated example embodiment, as alluded to above, a memory map for nonvolatile memory 700 is at least partially located within memory segment 710. Consequently, in accordance with the illustrated example, an initial analysis of memory segment 710 provides an indication of the integrity of memory map for nonvolatile memory 700.

In step 504, a determination is made as to whether the first segment of BIOS is corrupted. In one embodiment, if the first segment of BIOS is corrupted, the boot process executes a "precision" recovery of the corrupted segment from within the update mode, step 506. Unlike the "blind" recovery initiated from the update mode where a full reflash of all relevant segments of the segmented BIOS of nonvolatile memory 700 is "reflashed", the "precision" recovery within the update mode of step 506 merely "reflashes" those memory segments that have been identified as corrupted, in this case, memory segment 710. The method steps of the update mode will be described in greater detail below with reference to FIG. 6. In an alternate embodiment of the present invention, rather than immediately initiating the "precision" recovery of the update mode (step 506 ), the segmented BIOS "catalogs" the corrupted memory segment and continues with the analysis of additional memory segments until all memory segments have been analyzed and corrupted segments cataloged, whereupon the "precision" recovery of the update mode is initiated to "reflash" all cataloged corrupted memory segments. In yet another embodiment of the present invention, insofar as memory segment 710 of nonvolatile memory 700 contains at least a partial memory map of nonvolatile memory 700, if an initial analysis of this segment fails, a full reflash of all relevant segments of the BIOS is executed.

Returning to step 504, if the initial analysis of the first memory segment of BIOS is not corrupted (i.e., the chksum passed), or if the BIOS is merely cataloging corrupted memory segments, an analysis is performed on the remaining memory elements C0000hex to EFFFFhex of extended BIOS block 708, step 508. In step 510, a determination is made as to whether the remaining memory elements of extended BIOS block 708 are corrupted. In one embodiment, if the remaining memory elements comprising the extended BIOS region 708 are corrupted, the "precision" recovery of the update mode is executed. In an alternate embodiment, the memory segment is merely "cataloged" as corrupted for future "precision" recovery, as described above. If, in step 510, the analysis of the remaining elements comprising the extended BIOS region are not corrupted, a basic chipset configuration is loaded, step 512, which allows the boot process to continue and verify additional elements of nonvolatile memory 700 comprising the segmented BIOS.

In one embodiment, wherein the BIOS components have been compressed to minimize the storage space required to store the BIOS, the precision boot process while operating in the normal mode continues with the decompression of remaining BIOS components, step 514. Having decompressed the remaining BIOS components, step 514, or if no decompression is required, an analysis of the integrity of information stored in an external CMOS device is performed, step 516. In one embodiment, the external CMOS device has stored therein BIOS set-up configuration information necessary to complete execution of the BIOS. If, in step 508, it is determined that the CMOS device is corrupted, the CMOS is loaded with default parameters from nonvolatile memory via BIOS, step 520.

If the CMOS device passes the analysis of step 516, or upon loading the CMOS device with default settings, an analysis is next performed on the integrity of information stored in second parameter block 704, step 522. In step 524, a determination is made as to whether the Extended System Configuration Data (ESCD) of the second parameter segment 704 is corrupted. If it is determined in step 524 that the ESCD of the second parameter block 704 is corrupted, that portion of the second memory block 704 is cleared. In one embodiment, second parameter block 704 will be reconfigured with Extended System Configuration Data for peripheral components from system memory (e.g., RAM 108) as computer system 100 is shut down. In an alternate embodiment, second parameter block 704 is reconfigured with ESCD prior to booting the OS, step 532. If, in step 524 it is determined that the ESCD of second parameter block 704 is not corrupted, the basic chipset configuration loaded in step 512 is replaced with a full chipset configuration, step 528. Having loaded the full chipset configuration, step 528, POST testing is completed on the full chipset, step 530, and the operating system (OS) is loaded and executed, step 532.

Thus, once the OS is loaded and executed in step 532, computer system 100 of FIG. 1 incorporated with the teachings of the present invention, is ready for use having been configured with operating parameters using a single configuration selector 128 and a complementary BIOS, thereby reducing the number of costly configuration selectors required of the prior art systems.

With reference now to the illustrated example of FIG. 6, the operation of BIOS under the update mode will be described in the context of FIGS. 1, 2 and 7. As depicted in the example embodiment of FIG. 6, a flow chart illustrating the method steps for BIOS operation while computer system 100 is in update mode, is shown. Recall from the illustrated example embodiment of FIG. 3 that computer system 100 enters update mode in one of two ways. First, if configuration selector 128 is set to configure computer system 100 to operate in update mode (for Table 1, above, "11"), a "blind" recovery from within the update mode is executed, wherein a full reflash of all relevant segments of the writeable area (e.g., memory segments 704, 706, 708) of nonvolatile memory 700 are "reflashed". Second, if corrupted segment (s) of BIOS are identified during the precision BIOS boot process under the normal mode of computer system 100 operation, only those segment(s) determined to be corrupted are "reflashed". In either case, the "blind" recovery and the "precision" recovery of the update mode are identical, save for the size of the memory being "reflashed". One example of the update mode incorporating the teachings of the present invention is illustrated in the method steps of FIG. 6.

As illustrated in the example embodiment of FIG. 6, the update mode begins with, in step 602, a determination as to whether update information is available. In one embodiment, the update information is configuration information stored on a machine readable medium with a predetermined filename. In the illustrated example embodiment of FIG. 6, the update information is available as a data file on a floppy that is inserted into an available disk drive of computer system 100. In alternate embodiments of the present invention, the update information is made available during update mode from a remote source (e.g., a hard disk, or a network element). In one embodiment, if in step 602 it is determined that the update information is not available, the complementary BIOS will wait a predetermined period of time for a user of the computer system to provide the update information before timing out, step 604. Once the BIOS has timed out for lack of update information in step 604, BIOS executes a modified BIOS boot, step 606.

As depicted in the illustrated example embodiment of FIG. 6, the modified BIOS boot includes the execution of power-on self test (POST) as described above with reference to FIG. 4, step 608. Having completed POST, the modified BIOS boot concludes by prompting the user that configuration selector 128 may not be properly set, providing the user with the information necessary to make such a determination.

If, however, in step 602 it is determined that the update information is available, the recovery function of BIOS "reflashes" appropriate segments of nonvolatile memory 700 (depending upon whether it is a "blind" or a "precision" update) in the following manner. In accordance with the illustrated example embodiment of FIG. 6, BIOS operating under update mode executes a predetermined file located on the floppy drive, step 612. In one embodiment, for example, the predetermined file is an AUTOEXEC.BAT file located on a disk inserted in to the floppy drive. With the execution of the predetermined file, a flash memory update (FMUP) utility such as iFlash™ (from Intel, Corporation) is initiated, step 614, which manages the "reflashing" of appropriate segments of the BIOS.

In accordance with the teachings of the present invention, in one instance the FMUP will indiscriminately "reflash" the relevant segments of the BIOS stored in nonvolatile memory 700 (e.g., a full reflash, or "blind" recovery). In another instance, the FMUP will discriminately "reflash" only those segments of nonvolatile memory 700 having stored therein corrupted writeable segments of the BIOS. Once the FMUP utility has completed the recovery, the user of computer system 100 will be prompted that the BIOS update has been completed, step 616, with instructions to reconfigure configuration selector 128 to denote the normal mode, and to reboot computer system 100.

Thus, alternative embodiments for a method and apparatus for updating a basic input/output system have been described. While the method and apparatus of the present invention has been described in terms of the above illustrated embodiments, those skilled in the art will recognize that the invention is not limited to the embodiments described. Thus, the present invention can be practiced with modification and alteration without departing from the spirit and scope of the appended claims. Accordingly, the foregoing descriptions thereof are to be regarded as illustrative instead of restrictive on the present invention.

What is claimed is:

1. An apparatus comprising:
    a storage medium having stored therein a segmented basic input/output system (BIOS) divided among a plurality of segments within the storage medium, wherein the BIOS comprises a plurality of operational modes including:
        a normal mode,
            the normal mode including a verification function wherein the segmented BIOS analyzes the integrity of at least one segment of the BIOS and identifies whether the at least one segment is corrupted,
        an update mode, the update mode including a recovery function having a plurality of recovery levels, the recovery levels including:
            a blind recovery level wherein the BIOS executes a full reflash of all relevant segments of BIOS, and
            a precision recovery level wherein the BIOS reflashes only those BIOS segments previously identified by the BIOS as corrupted, and
        a configuration mode; and
    a processor, coupled to the storage medium, operative to execute the BIOS.

2. The apparatus of claim 1, wherein the full reflash of all relevant portions of the segmented BIOS reflashes an extended BIOS block and a first parameter block.

3. The apparatus of claim 2, wherein the full reflash of all relevant portions of the segmented BIOS excludes a reflash of memory blocks having stored therein vital product data (VPD) or extended system configuration data (ESCD).

4. The apparatus of claim 1, wherein the recovery function is operative to access update information, and to reflash identified corrupted BIOS segments of the plurality of segments with the accessed update information.

5. The apparatus of claim 4, wherein the update information is accessed from a diskette in a communicatively coupled disk drive.

6. The apparatus of claim 4, wherein the update information is accessed from a remote location.

7. The apparatus of claim 1, wherein the storage medium is a flash memory device.

8. The apparatus of claim 1, wherein a precision recovery level is established after the verification function detects a corrupted segment of the segmented BIOS, the precision recovery level initiating a reflash of only those BIOS segments identified as corrupted.

9. The apparatus of claim 8, wherein the precision recovery level is operative to immediately initiate the reflash upon having identified a corrupted BIOS segment.

10. The apparatus of claim 8, wherein the precision recovery level is operative to catalog corrupted ones of the plurality of BIOS segments.

11. The apparatus of claim 1 wherein the configuration mode is operative to allow manual configuration of a plurality of operating parameters of the apparatus.

12. In a computer system having a plurality of operating modes, a method for updating a segmented basic input/output system (BIOS) of the computer system comprising:
    (a) determining which of the plurality of operating modes the computer system is operating in;
    (b) executing a full reflash of all relevant segments of BIOS with update information, if it is determined in (a) that the computer system is operating in an update mode;
    (c) performing a precision boot wherein the precision boot includes the BIOS:
        analyzing the integrity of at least one segment of BIOS,
        determining whether the at least one segment of BIOS is corrupted, and
        rehashing with update information only the BIOS segments identified as corrupted, if it is determined in (a) that the computer system is operating in a normal mode; and
    (d) providing a graphical user interface wherein a plurality of computer system operating parameters may be entered, if it is determined in (a) that the computer system is operating in a configuration mode.

13. The method of claim 12, wherein all relevant segments of the plurality of BIOS segments includes extended BIOS blocks and a first parameter block.

14. The method of claim 12, wherein all relevant segments of the plurality of BIOS segments excludes BIOS segments containing vital product data (VPD) or extended system configuration data (ESCD).

15. The method of claim 12, wherein the update information is accessed from a local storage medium consisting essentially of a diskette in a disk drive or a hard drive.

16. The method of claim 12, wherein the update information is accessed from a remote storage medium.

17. A method for automatically updating a segmented basic input/output system (BIOS), the method comprising:
    (a) analyzing a first segment of a plurality of segments of the segmented BIOS, wherein the BIOS determines whether the first segment is a corrupted first segment;
    (b) reflashing only the first segment of the segmented BIOS, if it is determined by the BIOS in (a) to be a corrupted first segment;
    (c) analyzing a subsequent segment of the plurality of segments of the segmented BIOS, wherein the BIOS determines if the subsequent segment is a corrupted subsequent segment; and
    (d) reflashing only the subsequent segment of the plurality of segments of the segmented BIOS if it is determined by the BIOS in (c) to be a corrupted subsequent segment.

18. The method of claim 17, further comprising:
    (e) repeating (c) and (d) until each of the plurality of segments of the segmented BIOS have been individually analyzed and selectively reflashed by the BIOS.

19. The method of claim 17, wherein the reflashing of (b) and (d) further comprises
    (1) determining whether update information is available;
    (2) waiting a predetermined timeout period before executing a modified BIOS boot if the update information is not available; and
    (3) erasing the corrupted BIOS segment, accessing the update information and writing the accessed update information to the BIOS segment.

20. The method of claim 19, wherein the modified BIOS boot of (2) includes:
    (2.1) execute a power on self test to verify computer system integrity; and
    (2.2) prompting a user of the computer system that the recovery function, instructing the user to supply update information.

21. A machine readable medium having stored thereon a plurality of instructions for implementing a segmented basic input/output system (BIOS), the segmented BIOS including:
    a plurality of operating modes, and an operating mode dependent recovery function having a plurality of recovery levels, the plurality of recovery levels including:
  a blind recovery level wherein the BIOS executes a full reflash of all relevant segments of BIOS, if the machine is operating in an update mode; and
  a precision recovery level wherein the BIOS reflashes only those BIOS segments identified by the BIOS as corrupted, if the machine is operating in a normal mode.

* * * * *